United States Patent
Tauchi

(10) Patent No.: US 9,284,018 B2
(45) Date of Patent: Mar. 15, 2016

(54) BICYCLE TRANSMISSION CONTROL APPARATUS

(75) Inventor: Mitsuru Tauchi, Osaka (JP)

(73) Assignee: Shimano Inc., Osaka (JP)

( * ) Notice: Subject to any disclaimer, the term of this patent is extended or adjusted under 35 U.S.C. 154(b) by 1138 days.

(21) Appl. No.: 13/309,561

(22) Filed: Dec. 2, 2011

(65) Prior Publication Data

US 2013/0139634 A1   Jun. 6, 2013

(51) Int. Cl.
B62M 25/08   (2006.01)

(52) U.S. Cl.
CPC ........... *B62M 25/08* (2013.01); *Y10T 74/20037* (2015.01)

(58) Field of Classification Search
None
See application file for complete search history.

(56) References Cited

U.S. PATENT DOCUMENTS

| | | |
|---|---|---|
| 4,605,240 A | 8/1986 | Clem et al. |
| 5,497,143 A | 3/1996 | Matsuo et al. |
| 6,047,230 A * | 4/2000 | Spencer ................. B62M 9/123 474/70 |
| 2010/0048354 A1* | 2/2010 | Leibbrandt ......... F16H 61/0059 477/172 |
| 2010/0242655 A1* | 9/2010 | Ieda ........................ F16H 63/14 74/473.1 |

FOREIGN PATENT DOCUMENTS

| | | |
|---|---|---|
| CN | 1342586 A | 4/2002 |
| JP | 7-251786 A | 10/1995 |
| JP | 8-26170 A | 1/1996 |
| JP | 8-72777 A | 3/1996 |
| JP | 8-127383 A | 5/1996 |
| JP | 2617059 B2 | 3/1997 |
| JP | 3413886 B2 | 4/2003 |
| JP | 3647965 B2 | 2/2005 |

* cited by examiner

*Primary Examiner* — Edwin A Young
(74) *Attorney, Agent, or Firm* — Global IP Counselors

(57) ABSTRACT

A bicycle transmission control apparatus includes an inclination sensor and a controller. The controller outputs a shift signal to shift a bicycle transmission to a prescribed shift position based on an inclination detected by the inclination sensor while a bicycle equipped with the bicycle transmission is determined to be in a state corresponding to at least one of stopping to a rest state and beginning to move from the rest state.

9 Claims, 3 Drawing Sheets

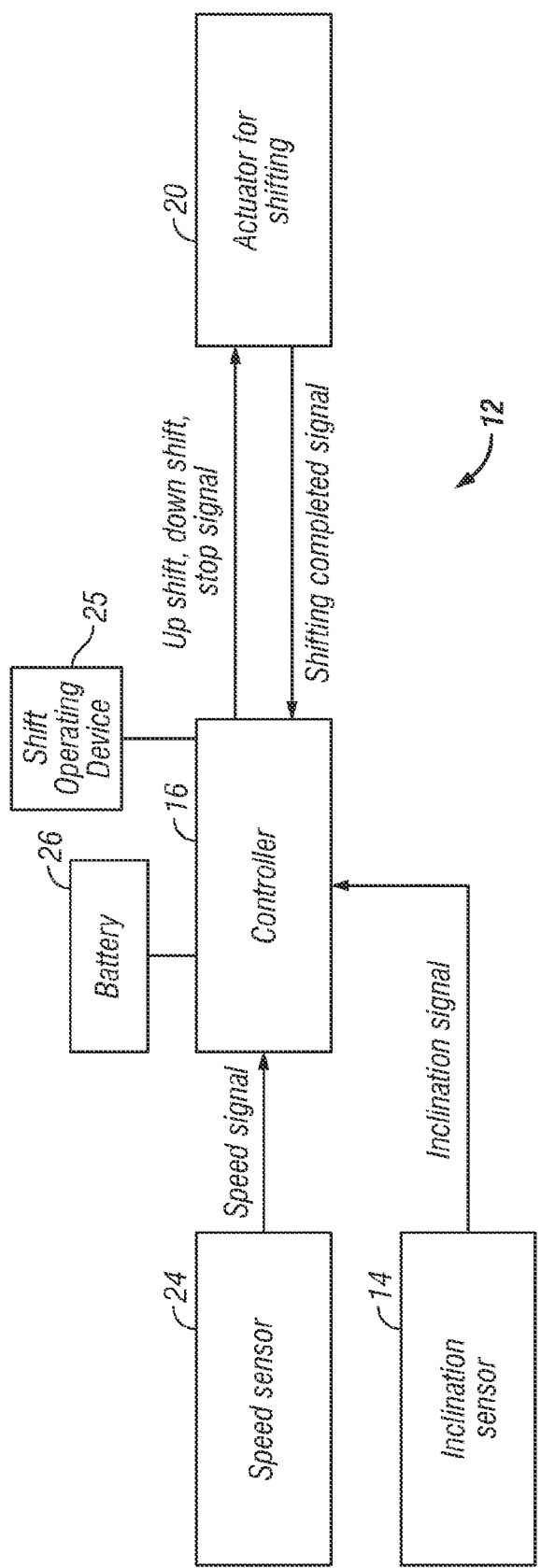

BICYCLE TRANSMISSION CONTROL APPARATUS

BACKGROUND

1. Field of the Invention

This invention generally relates to a bicycle transmission control apparatus. More specifically, the present invention relates to a bicycle transmission control apparatus that can shift a bicycle transmission to a prescribed shift position based on an inclination detected by an inclination sensor while the bicycle is stopping to a rest state or beginning to move from the rest state.

2. Background Information

Many bicycles include a transmission control apparatus that can control the bicycle transmission to shift to a desired shift position. One example of a bicycle including a conventional transmission control apparatus is disclosed in Japanese Laid-Open Patent Publication No. 2-617059. The conventional transmission control apparatus of this publication controls a motor to shift and set a transmission to a predetermined shift position when the bicycle is stopped. Another example of a bicycle including a conventional transmission control apparatus is disclosed in Japanese Laid-Open Patent Publication No. 3-413886. The conventional transmission control apparatus of this publication includes a slope detector that detects a degree of slope of the bicycle based on air pressure and a distance that the bicycle travels. The transmission control apparatus thus changes the gear position of the bicycle transmission based on the detected degree of slope.

SUMMARY

However, a need exists for an improved transmission control apparatus. Accordingly, one aspect is to provide a bicycle transmission control apparatus that can shift a bicycle transmission to a prescribed shift position based on an inclination detected by the inclination sensor while the bicycle is stopping to a rest state or beginning to move from the rest state.

In view of the state of the known technology, a bicycle transmission control apparatus is provided that includes an inclination sensor and a controller. The controller is configured to output a shift signal to shift a bicycle transmission to a prescribed shift position based on an inclination detected by the inclination sensor while a bicycle equipped with the bicycle transmission is determined to be in a state corresponding to at least one of stopping to a rest state and beginning to move from the rest state.

These and other objects, features, aspects and advantages of the disclosed bicycle transmission control apparatus will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 2 is a schematic illustrating exemplary components of the bicycle transmission control apparatus;

FIG. 3 provides a chart showing an example of transmission shifting controlled by the transmission control apparatus based on certain criteria.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
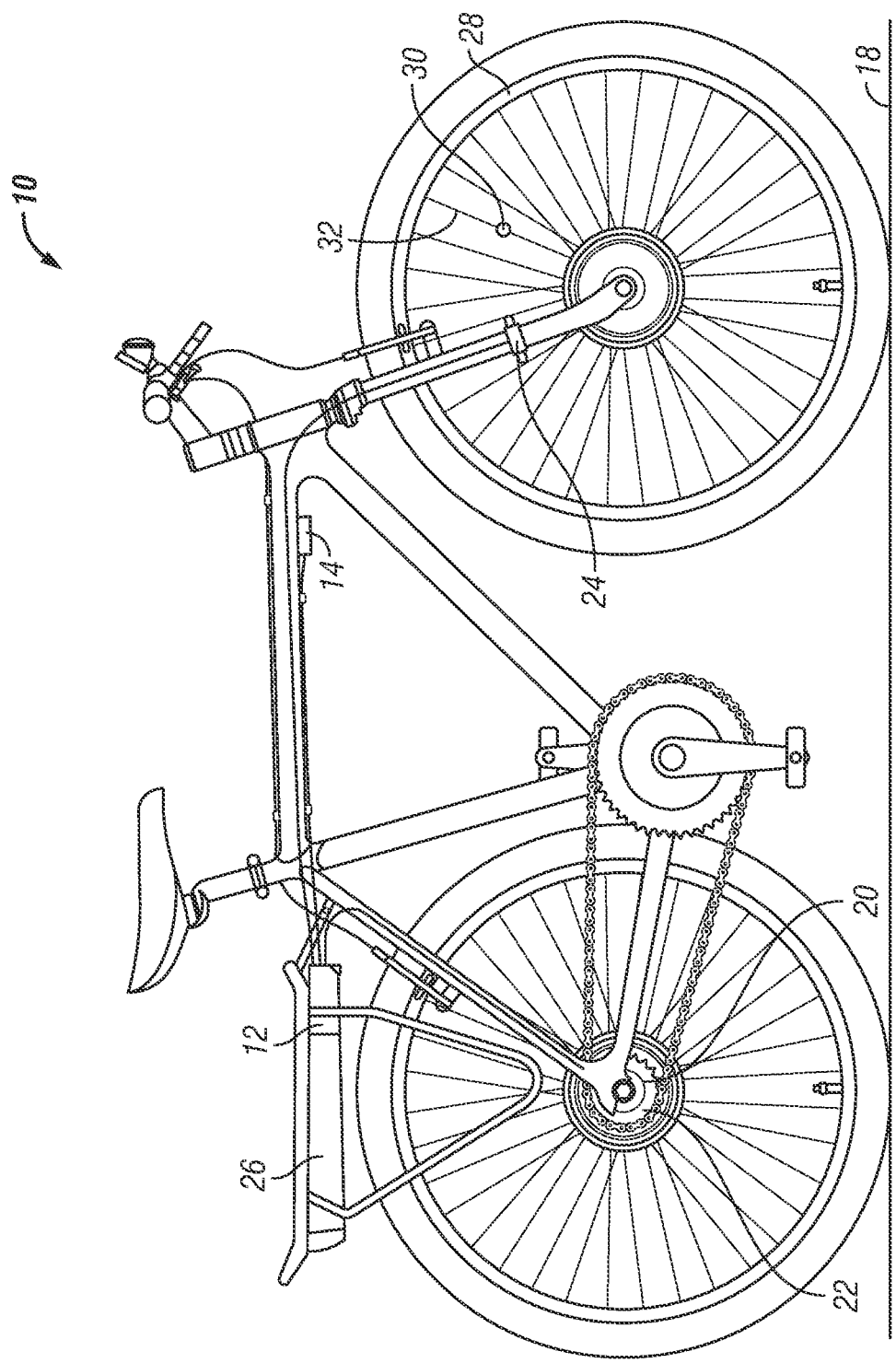
FIG. 1 is a side elevational view of a bicycle that is equipped with a bicycle transmission control apparatus in accordance with an illustrated embodiment.

FIG. 1 illustrates a bicycle 10 that includes a bicycle transmission control apparatus 12 according to a disclosed embodiment. The bicycle 10 can be a manual bicycle or a motor assisted bicycle as known in the art. As further shown in FIG. 2, the bicycle transmission control apparatus 12 includes an inclination sensor 14 and a controller 16. The inclination sensor 14 operates to detect an inclination or slant with respect to the horizontal. Thus, the inclination sensor 14 can detect the inclination or slant of the bicycle 10, which can represent the inclination of the terrain 18 upon which the bicycle 10 is travelling. The inclination sensor 14 can be any suitable type of inclination sensor, such as an inclination sensor that includes an accelerometer or any other type of sensor as known in the art.

The controller 16 preferably includes a microcomputer with a control program that controls the bicycle transmission control apparatus 12 as discussed herein. The controller 16 can also include other conventional components such as an input interface circuit, an output interface circuit, and storage devices such as a ROM (Read Only Memory) device and a RAM (Random Access Memory) device. The RAM and ROM store processing results and control programs that are run by the controller 16. The controller 16 is operatively coupled to the components of the bicycle transmission control apparatus 12, and to the components of the bicycle 10 as appropriate, in a conventional manner. It will be apparent to those skilled in the art from this disclosure that the precise structure and algorithms for the controller 16 can be any combination of hardware and software that will carry out the functions of the embodiments discussed herein.

As further discussed below, the controller 16 is configured to output a shift signal to an actuator 20, such as a derailleur or other suitable type of gear shift changing device, to shift a bicycle transmission 22 to a prescribed shift position according to the shift signal. The shift signal is provided by the controller 16 based on an inclination detected by the inclination sensor 14 while the bicycle 10 is determined to be in a state corresponding to stopping to a rest state or beginning to move from the rest state. The bicycle transmission 22 can be any suitable type of transmission, such as a continuous transmission, an internal hub transmission and so on. The bicycle transmission control apparatus 12 thus further includes a speed sensor 24 that is configured to detect the speed of the bicycle 10. The controller 16 can communicate with the inclination sensor 14, the actuator for shifting 20, the speed sensor 24 and any other component of the bicycle 10 via wired or wireless connections as understood in the art. Also, a shift operating device 25 that includes, for example, an up shift switch and a down shift switch, can provide signals to the controller 16 via a wired or wireless connection to control up shifting and down shifting of the bicycle transmission 22 as understood in the art. Furthermore, the transmission control apparatus 12 can include or be connected to a battery 26 that powers the bicycle transmission control apparatus 12 and the components discussed herein.

The speed sensor 24 can be the type of speed sensor that detects the number of revolutions per minute of one of the bicycle wheels 28. For example, the speed sensor 24 can detect the number of times that a magnet 30 attached to one of the spokes 32 of the bicycle wheel 28 passes the speed sensor 24 within a prescribed period of time. The speed sensor 24 or the controller 16 can thus calculate the revolutions per minute of the bicycle wheel 28 to determine the speed of the bicycle 10. In this embodiment, one magnet 30 is attached to one of the spokes 32. However, one or several magnets 30 may be attached to each of a plurality of the spokes 32, or to all of the spokes 32. In such an arrangement, the magnets 30 are thus spaced in a rotational direction of the bicycle wheel 28. Also, instead of using a speed sensor 24 and magnet 30 arrangement, the speed of the bicycle 10 may be detected by an alternating signal from a dynamo generator that can be installed, for example, at a bicycle hub as can be appreciated by one skilled in the art. In any event, these speed detecting arrangements operate to detect the speed of the bicycle 10 as well as the start of movement of the bicycle 10.

Figure 4:
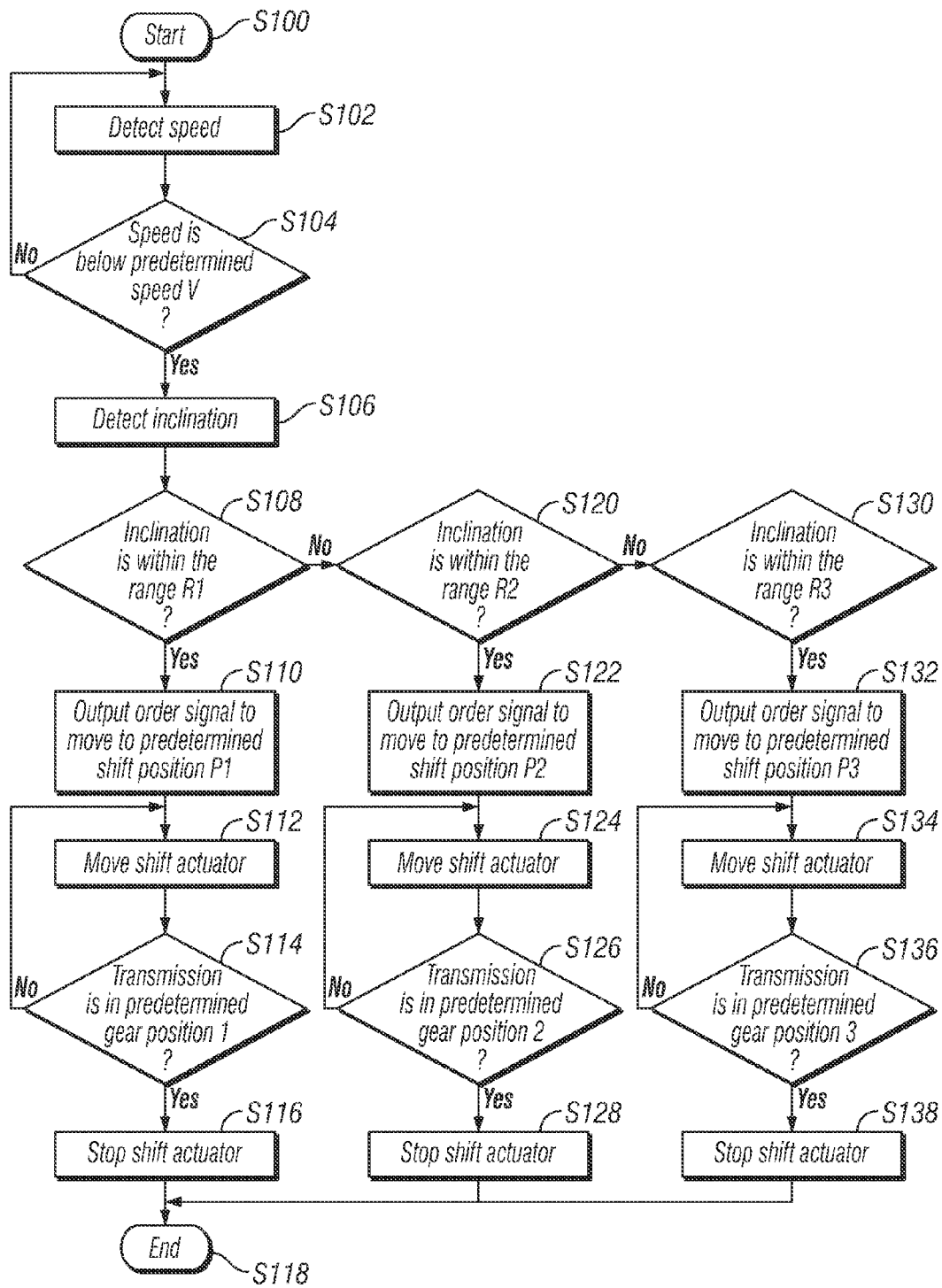
FIG. 4 is a flowchart illustrating an example of operations performed by the transmission control apparatus.

FIG. 3 provides a chart 34 showing an example of transmission shifting controlled by the transmission control apparatus 12 based on certain criteria. FIG. 4 is a flowchart illustrating an example of operations performed by the transmission control apparatus 12 as will now be discussed.

After the process begins in step S100, the controller 16 will receive a speed signal from speed sensor 24 indicating the detected speed of the bicycle in step S102. If the controller 16 determines in step S104 that the detected speed is not below a predetermined speed V, the processing will return to step S102. However, when the controller 16 determines in step S104 that the detected speed is below the predetermined speed V, the processing will continue to step S106. In this example, the predetermined speed V can be at or about 2.0 km/hour.

In step S106, the controller 16 will receive an inclination signal from inclination sensor 14 representing the detected inclination of the bicycle 10. In step S108, the controller 16 will determine whether the detected inclination is within a first range of inclination which is represented as R1 in chart 34 (e.g. the detected inclination is greater than or equal to a first prescribed inclination amount). If the detected inclination is within the first range of inclination, the processing continues to step S110 where the controller 16 provides a shift signal indicating a first gear ratio for the bicycle transmission 22 to actuator 20 to control actuator 20 to shift the bicycle transmission 22 to a prescribed gear position (gear position 1 in chart 34). In this example, the controller 16 provides the shift signal to shift the bicycle transmission 22 to the prescribed shift position based on the inclination detected by the inclination sensor 14 upon a determination that a speed of the bicycle 10 changes to indicate that the bicycle 10 is moving and has slowed to below 2.0 km/hour. Naturally, the transmission control apparatus 12 can be configured so that the controller 16 provides the shift signal to shift the bicycle transmission 22 when the bicycle 10 has slowed to below any suitable speed (e.g. 1.5 km/hour, 1.0 km/hour or 0.5 km/hour) or the bicycle has stopped. Therefore, when bicycle 10 is stopped, the bicycle transmission 22 has been set to a suitable shift position that can then be used to start moving the bicycle 10 from the stopped condition.

To accomplish the shifting, the actuator 20 will begin shift the bicycle transmission 22 in step S112. It is determined in step S114 whether the bicycle transmission 22 is in the desired gear position 1. If the bicycle transmission 22 is not in the desired gear position 1, the actuator 20 will continue shifting the bicycle transmission 22 in step S112. Then, once it is determined in step S114 that the bicycle transmission 22 is in the desired gear position 1, the actuator 20 will send a shifting completed signal to the controller 16. The controller 16 can therefore provide a stop shifting signal to the actuator 20 in step S116 to stop the actuator 20 front shifting the bicycle transmission 22.

The processing can then end in step S118 and repeat at step S100. In general, the controller 16 is continuously performing the processing beginning in step S100 when the controller 16 is turned on or otherwise activated.

However, if the detected inclination is determined to not be within the first range of inclination in step S108, the processing proceeds to step S120. In step S120, the controller 16 will determine whether the detected inclination is within a second range of inclination which is represented as R2 in chart 34. As illustrated, the second range of inclination is lower than the first range of inclination (e.g., the second inclination amount detected by the inclination sensor 14 is lower than the first prescribed inclination amount).

If the detected inclination is determined to be within the second range of inclination in step S120, the processing continues to step S122 where the controller 16 provides a shift signal to actuator 20. This shift signal indicates a second gear ratio for the bicycle transmission 22 that is higher than the first gear ratio to control actuator 20 to shift the bicycle transmission 22 to a prescribed gear position (gear position 2 in chart 34). The shift signal controls the actuator 20 to begin shifting the bicycle transmission 22 in step S124. In step S126, it is determined whether the bicycle transmission 22 is in the desired gear position 2. If the bicycle transmission 22 is not in the desired gear position 2, the actuator 20 will continue shifting the bicycle transmission 22 in step S124. Then, once it is determined in step S126 that the bicycle transmission 22 is in the desired gear position 2, the actuator 20 will send a shifting completed signal to the controller 16. The controller 16 can therefore provide a stop shifting signal to the actuator 20 in step S128 to stop the actuator 20 from shifting the bicycle transmission 22. The processing can then end in step S118 and repeat at step S100 as discussed above.

However, if the detected inclination is determined to not be within the second range of inclination in step S120, the processing proceeds to step S130. In step S130, the controller 16 will determine whether the detected inclination is within a third range of inclination which is represented as R3 in chart 34. As illustrated, the third range of inclination is lower than the second range of inclination (e.g., the inclination detected by the inclination sensor 14 is lower than a second prescribed inclination amount, which is lower than the first prescribed inclination amount).

If the detected inclination is determined to be within the third range of inclination in step S130, the processing continues to step S132 where the controller 16 provides a shift signal to actuator 20. This shift signal indicates a third gear ratio for the bicycle transmission 22 that is higher than the second gear ratio to control actuator 20 to shift the bicycle transmission 22 to a prescribed gear position (gear position 3 in chart 34). The shift signal control actuator 20 to begin shifting the bicycle transmission 22 to a prescribed gear position (gear position 3 in chart 34). The actuator 20 will begin shift the bicycle transmission 22 in step S134. It is determined in step S136 whether the bicycle transmission 22 is in the desired gear position 3. If the bicycle transmission 22 is not in the desired gear position 3, the actuator 20 will continue shifting the bicycle transmission 22 in step S134. Then, once it is determined in step S136 that the bicycle transmission 22 is in the desired gear position 3, the actuator 20 will send a shifting completed signal to the controller 16. The controller 16 can therefore provide a stop shifting signal to the actuator 20 in step S138 to stop the actuator 20 from shifting the bicycle transmission 22. The processing can then end in step S118 and repeat at step S100 as discussed above.

Although the process discussed above includes three ranges of inclination and three corresponding gear positions, the process can be performed for any suitable number of ranges of inclination and corresponding gear positions (e.g., gear position 5, 7, 8, 9 or 11). Furthermore, in the illustrated embodiment discussed above, the inclination sensor 14 or the controller 16 detects a positive incline and a negative incline of the bicycle 10. That is, when the front of the bicycle 10 is more vertical (higher) than the rear of the bicycle 10, the inclination sensor 14 or the controller 16 detects a positive incline of the bicycle 10. Also, when the rear of the bicycle 10 is more vertical (higher) than the front of the bicycle 10, the inclination sensor 14 or the controller 16 detects a negative incline of the bicycle 10. However, the inclination sensor 14 or the controller 16 can be configured to detect only a positive incline or only a negative incline of the bicycle 10 with reference to a predetermined position.

In addition, in the embodiment discussed above, when the bicycle 10 is on a downward slope (i.e., a negative incline), the gear ratio of the bicycle transmission 22 is set to be larger than the gear ratio that is set when the bicycle 10 is on an upward slope (i.e., a positive incline) or on level ground. Also, the gear ratio of the bicycle transmission 22 that is set when the bicycle 10 is on level ground can be larger than the gear ratio that is set when the bicycle 10 is on an upward slope.

Also, during step S104, the controller 16 may be configured to detect when the bicycle 10 begins to move from a rest state. For example, the controller 16 can determine that the bicycle 10 has begin to move from a rest state when the controller 16 receives a speed signal from the speed sensor 24 indicating a speed after the controller 16 has not received a speed signal from the speed sensor 24 for a predetermined period of time.

Furthermore, in the illustrated embodiment, the bicycle transmission 22 is disposed on a rear hub of the bicycle 10. However, the bicycle transmission 22 may disposed on a crank portion of the bicycle 10, a bottom bracket portion of the bicycle 10, or on any other portion of bicycle 10 as can be appreciated by one skilled in the art.

Also, in the illustrated embodiment, the battery 26 provides electric power to the bicycle transmission control apparatus 12. However, instead of the battery 26, a dynamo generator, such as a hub dynamo generator or a block dynamo generator, may provide electric power to the bicycle transmission control apparatus 12. Naturally, the dynamo generator can be coupled to a circuit that includes, for example, an accumulator (e.g., a capacitor) and a rectifier, to provide electric power to the bicycle transmission control apparatus 12 as understood in the art.

In addition, in the illustrated embodiment, the shift operating device 25 is electrically coupled to the controller 16. As discussed above, the shift operating device 25 can be configured to include an up shift switch and a down shift switch. When the up shift switch is operated, an up shift operating signal is received by the controller 16. When the down shift switch is operated, a down shift operating signal is received by the controller 16. The controller 16 thus controls the actuator 20 to up shift or down shift the bicycle transmission 22 based on the up shift and down shift operating signals. Furthermore, the controller 16 can be configured to refrain from controlling the actuator 20 based on the up shift and down shift operating signals when the detected speed of the bicycle 10 is below the predetermined speed discussed above. On the other hand, if the controller 16 has received the up shift operating signal or the down shift operating signal before performing the process shown in FIG. 4, the controller 16 can control the actuator 20 based on the up shift or down shift operating signals to shift the bicycle transmission 22 to the appropriate gear ratio. Thus, when the controller 16 is controlling the actuator 20 based on the up shift or down shift operating signals, the controller 16 can refrain from performing the operations described above and as shown in the flowchart of FIG. 4 for a predetermined period of time to allow the actuator 20 to shift the bicycle transmission 22 to the appropriate gear ratio.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle transmission control apparatus comprising:
   an inclination sensor; and
   a controller configured to output a shift signal to shift a bicycle transmission to a prescribed shift position based on an inclination detected by the inclination sensor while a bicycle equipped with the bicycle transmission is determined to be in a state corresponding to at least one of a condition in which the bicycle is stopping to a rest state and a condition in which the bicycle is beginning to move from the rest state, the rest state being a state during which the bicycle does not move.

2. The bicycle transmission control apparatus according to claim 1, wherein
   the controller is configured to provide the shift signal to shift the bicycle transmission to the prescribed shift position based on the inclination detected by the inclination sensor upon a determination that a speed of the bicycle changes to indicate that the bicycle is moving and has slowed to below 2.0 km/hour.

3. The bicycle transmission control apparatus according to claim 1 further comprising
a speed sensor configured to detect the speed of the bicycle.

4. The bicycle transmission control apparatus according to claim 1, further comprising
a gear shift changing device configured to shift the transmission to the prescribed shift position based on the shift signal provided by the controller.

5. The bicycle transmission control apparatus according to claim 1, wherein
the controller is further configured to provide a shift signal indicating a first gear ratio for the bicycle transmission upon determining that the inclination detected by the inclination sensor is within a first range; and
the controller is further configured to provide the shift signal indicating a second gear ratio for the bicycle transmission that is higher than the first gear ratio upon determining that the inclination detected by the inclination sensor is within a second range that is lower than the first range.

6. The bicycle transmission control apparatus according to claim 5, wherein
the controller is further configured to provide the shift signal indicating a third gear ratio for the bicycle transmission higher than the second gear ratio upon determining that the inclination detected by the inclination sensor is within a third range that is lower than the second range.

7. The bicycle transmission control apparatus according to claim 1, wherein
the controller is further configured to provide a shift signal indicating a first gear ratio for the bicycle transmission upon determining that the inclination detected by the inclination sensor is greater than or equal to a first prescribed inclination amount; and
the controller is further configured to provide the shift signal indicating a second gear ratio for the bicycle transmission that is higher than the first gear ratio upon determining that the inclination detected by the inclination sensor is lower than the first prescribed inclination amount.

8. The bicycle transmission control apparatus according to claim 7, wherein
the controller is further configured to provide the shift signal indicating a third gear ratio for the bicycle transmission higher than the second gear ratio upon determining that the inclination detected by the inclination sensor is lower than a second prescribed inclination amount, which is lower than the first prescribed inclination amount.

9. The bicycle transmission control apparatus according to claim 1, wherein
the controller is configured to control an internal hub transmission as the bicycle transmission.

* * * * *